UNITED STATES PATENT OFFICE.

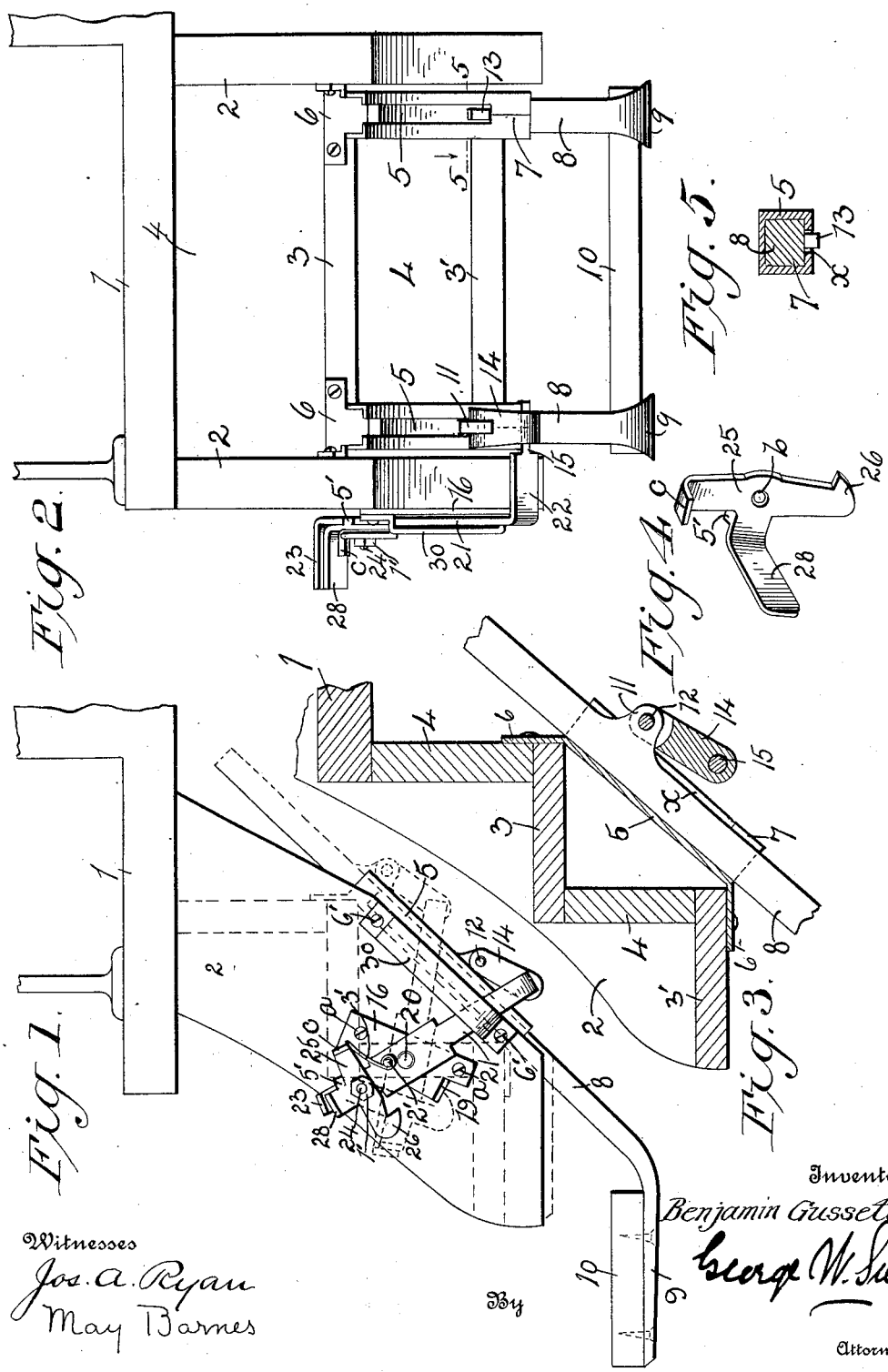

BENJAMIN GUSSETTE, OF WARD SPRINGS, MINNESOTA.

EXTENSION CAR-STEP.

1,093,617.  Specification of Letters Patent.  Patented Apr. 21, 1914.

Application filed September 5, 1913. Serial No. 788,312.

*To all whom it may concern:*

Be it known that I, BENJAMIN GUSSETTE, a citizen of the United States, and a resident of Ward Springs, in the county of Todd and State of Minnesota, have invented certain new and useful Improvements in Extension Car-Steps, of which the following is a specification, reference being had to the accompanying drawings.

This invention relates to certain new and useful improvements in extension steps employed in connection with passenger cars and coaches, and the object of my invention is to provide a passenger car with an auxiliary step, arranged to fold against the lowermost tread of the fixed car steps, so that when loading or unloading passengers, the car steps can be prolonged one step or tread.

Another object is to provide a folding car step, which when not in use, is folded against the bottom of the fixed step, the invention being of a simple and inexpensive nature and of a compact and durable construction, and is capable of being instantly thrown down or folded out of working position.

With these and other objects in view, the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification and in which numerals of reference indicate similar parts in the several views: Figure 1, shows a view of a car step provided with a folding auxiliary car step embodying my invention, disclosing the step in folded condition in dotted lines. Fig. 2, shows a rear view of Fig. 1. Fig. 3, is a detail of the slotted housing showing one of the riser bars. Fig. 4, is a detail of the detent. Fig. 5, is a section on line 5, 5, of Fig. 2.

In my present invention I provide a folding car step, which can be instantly thrown into or out of working position, the step being arranged to add to the length of the permanent car step.

In the drawings the numeral 1, represents the rear platform of a passenger car, and 2, 2, the runners of the car step provided with the treads 3, 3', and the risers 4. Secured to the rear of the treads are two slotted housings 5, secured in parallel spaced relation. Each housing ends in a securing ear 6, as shown in Fig. 3, so that these housings can be securely attached to the rear of the car step. As shown the slot $x$, of the housings enters from above, the lower portion 7, of the rear of each housing forming a stop, as disclosed in Figs. 3 and 5.

Slidably held within these slotted housings are the two similar riser bars 8, 8, each having its lower end 9, flattened as shown in Fig. 1, and provided with the auxiliary tread or step 10. As shown the step 10, connects the riser bars.

One riser bar has a stop lug 7, and the other a corresponding stop ear 13. In Fig. 2, the stop ear and lug are shown as held within the bottom of the housing slots $x$.

Secured to one of the runners 2, as the one adjacent the riser bar having the stop ear 11, is the supporting plate 16, having the outstanding lip 19, and the pivot pin 20. This supporting plate is secured by means of the screws $a$, and gives pivotal support to the operating lever 21, which at its upper end is provided with the handle 23, the lower end 22, being bent at right angles and ending in the pivot stem 15, arranged to engage within an opening of the link 14, which is held upon the pin 12, secured to the ear 11, as shown in Fig. 3. In throwing the lever 21 up and down the car step 10, may be raised or lowered.

When the step 10 is lowered the same is supported by means of the riser bars, which bars in turn are held by means of the ear 11, and lug 13, in the manner shown in Fig. 2.

In order to hold the step 10 in a closed position and below the bottom step 3' I provide the lever 21, with a stud bolt 24, upon which is pivotally held the detent 25, having the beak hook 26, arranged to snap over and engage the lip 19, to hold the step in a closed condition.

To insure the detent being held to the lip 19, I provide the spring 3' held upon the pin 2' secured to the lever 21, as shown in Fig. 1. To limit the downward movement of the beak hook 26, I provide the detent 25 with a stop ear 5' arranged to strike the lever 21. As shown in Fig. 4, the detent 25, is provided with the opening $b$, arranged to receive the stud bolt 24 and the outstanding ear c, against which the spring 3' normally presses. The detent 25 is operated by means of the handle 28, extending therefrom and held parallel to the handle 23 extending from the lever 21, as shown in Figs. 1 and 2.

In the closed position of the step 10, the beak hook is in engagement with the lip 19. When it is desired to add one step to the fixed car step 2, the operator simply grasps the two handles 23 and 28, in doing this the beak hook 26 is released from the lip 19. In then swinging the handle 23 upward the riser bars 8 are lowered with the connected step 10. To draw the auxiliary step into a folded condition the operator simply draws the handle 23 downward so that the beak hook will again engage the lip 19. The lower end of the lever 21 works below the bar 30, secured by means of the screws C', as shown in Fig. 1.

The auxiliary car step is of a simple and inexpensive construction and both durable and efficient in operation, and the auxiliary step can be instantly thrown into working position or folded against the fixed bottom car step, with ease, accuracy and despatch.

Having thus described my said invention what I claim as new and desire to secure by United States Letters Patent is:

1. The combination with a car step, of two slotted housings secured to the rear of the risers, a riser bar slidably held within each housing one having a stop ear and the other a stop lug, a tread secured to the lower ends of said riser bars, a rub plate secured to one of the runners of said steps having an outstanding lip and a pivot pin, an operating lever upon said pivot pin ending at its lower end in a pivot stem, a link secured to said stem and said ear, and a detent pivotally secured to said lever having a beak hook arranged to engage said lip in one position.

2. The combination with a car step, of two slotted housings secured to the rear of the risers, a riser bar slidably held within each housing one having a stop ear and the other a stop lug, a tread secured to the lower ends of said riser bars, a rub plate secured to one of the runners of said steps having an outstanding lip and a pivot pin, an operating lever upon said pivot pin ending at its lower end in a pivot stem, a link secured to said stem and said ear, a detent pivotally secured to said lever having a stop ear and a beak hook arranged to engage said lip in one position, and a spring secured to said lever to force said stop ear against said lever.

3. The combination with a car step, of two slotted housings secured to the rear of the risers, a riser bar slidably held within each housing one having a stop ear and the other a stop lug, a tread secured to the lower ends of said riser bars, a rub plate secured to one of the runners of said steps having an outstanding lip and a pivot pin, an operating lever upon said pivot pin ending at its lower end in a pivot stem, a link secured to said stem and said ear, a detent pivotally secured to said lever having a stop ear, and a beak hook arranged to engage said lip in one position, a spring secured to said lever to force said stop ear against said lever, and a handle extending from said detent.

4. The combination with a car step, of two slotted housings secured to the rear of the risers, a riser bar slidably held within each housing one having a stop ear and the other a stop lug, a tread secured to the lower ends of said riser bars, a rub plate secured to one of the runners of said steps having an outstanding lip and a pivot pin, an operating lever upon said pivot pin ending at its lower end in a pivot stem, a link secured to said stem and said ear, a detent pivotally secured to said lever having a stop ear and a beak hook arranged to engage said lip in one position, a spring secured to said lever to force said stop ear against said lever, a handle extending from said lever, and a handle extending from said detent held parallel to said lever handle.

In testimony whereof I affix my signature, in the presence of two witnesses.

BENJAMIN GUSSETTE.

Witnesses:
WILL WILKE,
F. H. NEUMANN.